March 2, 1971   W. R. SMITH-VANIZ   3,567,326
ALIGNMENT APPARATUS
Filed May 20, 1968   2 Sheets-Sheet 1
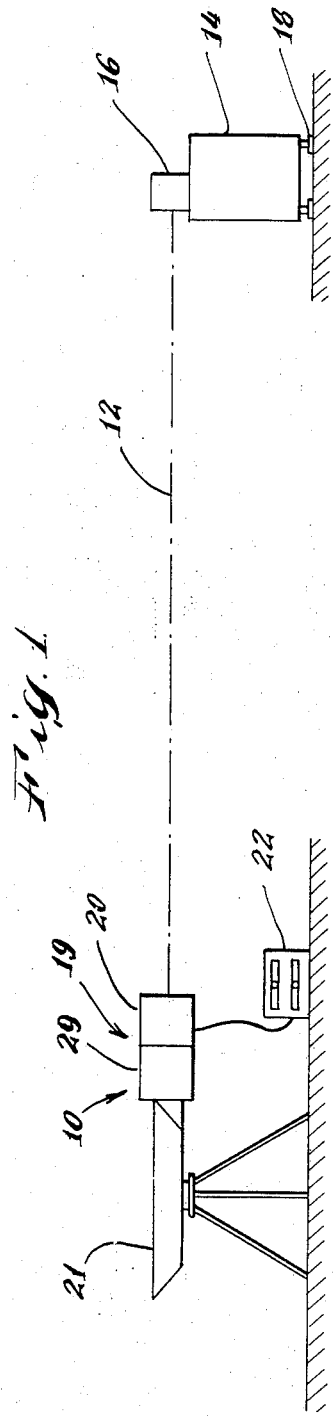
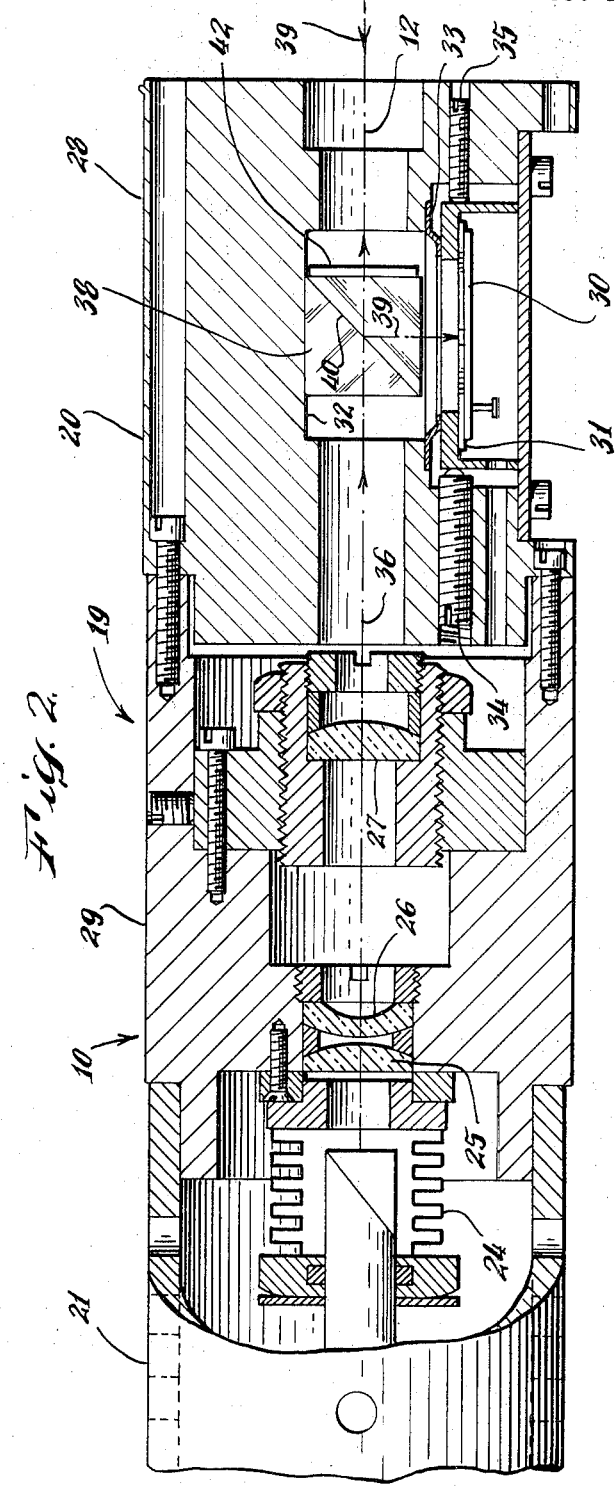
INVENTOR.
William R. Smith-Vaniz
BY
Frank J. Thompson
ATTORNEY.

March 2, 1971     W. R. SMITH-VANIZ     3,567,326
ALIGNMENT APPARATUS

Filed May 20, 1968     2 Sheets-Sheet 2

INVENTOR.
William R. Smith-Vaniz
BY
Frank J. Thompson
ATTORNEY.

United States Patent Office 3,567,326
Patented Mar. 2, 1971

3,567,326
ALIGNMENT APPARATUS
William R. Smith-Vaniz, Darien, Conn., assignor to The Perkin-Elmer Corporation, Norwalk, Conn.
Filed May 20, 1968, Ser. No. 730,396
Int. Cl. G01b 11/27
U.S. Cl. 356—114
13 Claims

ABSTRACT OF THE DISCLOSURE

An alignment apparatus having a laser light source which provides an output beam for projection at a reflective surface remotely positioned at a target object, a locally positioned beam sensing means, and a locally positioned beam reflective means disposed in the beam path for directing a reflected beam at said sensing means includes a beam polarization means disposed between the light source and the remote reflective surface. This polarizing means is adapted for altering the relative polarization of the output and reflected beams in a manner for attenuating interference fringes at the sensing means. The light transmission efficiency of this arrangement is substantially enhanced by utilizing a reflective means having a polarizing surface adapted for transmitting light of a first polarization and reflecting light of a second orthogonal polarization.

---

This inventon relates to apparatus for aligning the position of a body in space. The invention relates more particularly to an improved apparatus for the spatial alignment of a body with respect to a reference light beam.

In a known alignment arrangement a laser light beam is utilized as a reference line for the alignment in space of a body which is positioned remotely with respect to the laser. The beam is projected toward a target reflective surface at the body and the path of the beams which is reflected therefrom deviates angularly from the path of the incident beam by an amount related to the displacement of the body from a plane normal to the incident beam. This deviation is sensed by means including a planar array of photocells which is positioned locally with respect to the laser and which provides a visual output indication of the deviation. As the misalignment is decreased, the reflected beam path and the incident beam path approach coincidence. An apparatus of this type is disclosed in co-pending United States patent application Ser. No. 622,508, filed on Mar. 13, 1967, and which is assigned to the assignee of the present application.

It is found that at times an optical surface of the laser light source and the target reflective surface operate to undesirably reduce the accuracy of alignment. In particular the laser light source includes a dumper mirror from which a laser output beam emanates. As the alignment approaches a relatively high degree of accuracy, a reflective surface of the dumper mirror and the target object reflective surface form a Fabry-Perot interferometer which establishes interference fringes at the sensing means and reduces the accuracy of alignment.

Accordingly, it is an object of this invention to provide an improved alignment apparatus of the type described.

Another object of this invention is to provide a means for substantially inhibiting the generation of interference fringes in an alignment apparatus of the type described.

Another object of the invention is to attenuate undesired fringes in an alignment apparatus of the type described while providing light beam transmission efficiency at a relatively high level.

A further object of the invention is the improvement of light beam transmission efficiency in an alignment apparatus of the type described.

In accordance with features of the present invention, an alignment apparatus having a laser light source which provides an output beam for projection at a reflective surface remotely positioned at a target object, a locally positioned beam sensing means, and a locally positioned beam reflective means disposed in the beam path for directing a reflected beam at said sensing means includes a beam polarization means disposed between the light source and the remote reflective surface. This polarizing means is adapted for altering the relative polarization of the output and reflected beams in a manner for attenuating interference fringes at the sensing means.

In accordance with another feature of this invention, the locally positioned beam reflective means comprises a means adapted for transmitting light of a first polarization and for reflecting light of a second orthogonal polarization.

These and other objects and features of the invention will become apparent with reference to the following specifications and drawings wherein:

FIG. 1 is a diagram illustrating the general arrangement of an improved alignment apparatus constructed in accordance with features of the present invention;

FIG. 2 is a diagram partly in section illustrating a laser light source and interference attenuating means of the present invention; and, FIG. 3 is a diagram illustrating the light beam at different stages in the apparatus.

Figure 3A:
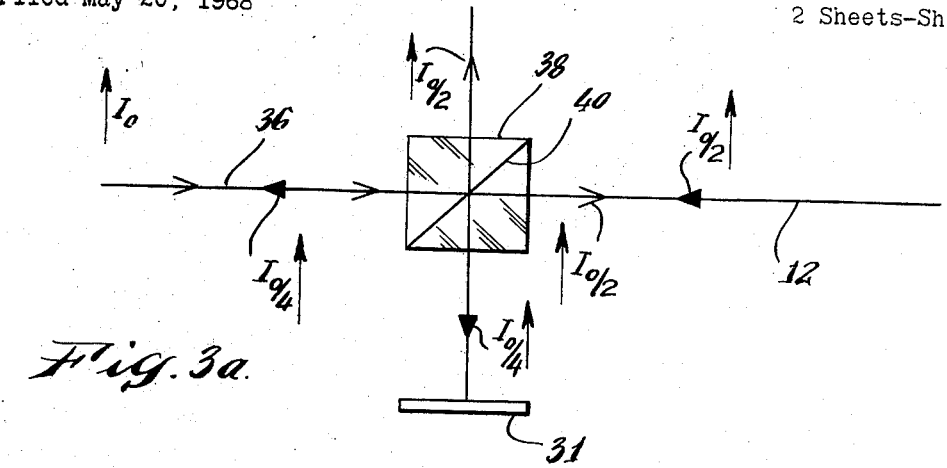

In FIG. 1, a laser light source is indicated generally as 10. A collimated light beam 12 which is derived from the source is projected at a remotely positioned target object 14. A reflective means 16 comprising a trihedral prism or planar reflective surface is positioned at the target and is adapted for reflecting the incident beam 12 in a direction toward the light source 10. It is desired to sired alignment of the body 14 is obtained, the beam 12 is ence point thereof lies in a plane which is normal to the direction of the beam and is additionally aligned transversely in this plane. Adjusting screws 18 are provided for varying the position of the body in a manner for attaining this alignment. A collimating means 19 and a beam reflective and detection means 20 is mounted to the laser housing at a beam output position. When the desired alignment of the body 14 is obtained, the beam 12 is reflected upon itself and the detection means 20 provides a corresponding indication. As the body deviates from the desired alignment, a corresponding deviation occurs in the reflected beam from the projection path of the beam 12 and the detection means provides a corresponding indication of the deviation. This indication is displayed by center reading ammeters 22 which are adapted for indicating both the magnitude and direction of displacement along mutually perpendicular axes.

FIG. 2, which is a plan view of a portion of the laser light source of FIG. 1, illustrates in section form the arrangement of the collimating means 19 and beam reflecting and detection means 20. Laser light sources are well known and only a Brewster window 23, bellows 24 and dumper mirror 25 are shown in detail. A typical laser light source for use in this application is the Perkin-Elmer Model 5600 which provides a collimated red beam of about 10 mm. diameter. The collimating means 19 includes an expander lens 26 and an objective lens 27 mounted in a housing 29. This housing is secured to the laser cavity housing 21.

The beam reflective and detection means includes a cylindrical housing 28 which is mounted to the collimator housing 29. A tubular aperture having differing diameters extends the length of the housing 28 in an axial direction. The laser generates an output beam 36 which is transmitted through this aperture in the housing to a beam reflective means 38 and is then projected to the target as a projected beam 12. The beam reflective means 38 of FIG. 2 comprises a beam splitter having a high efficiency dielectric reflective surface 40 and is secured to an inner wall in the aperture adjacent a planar array of solar cells 30. The array of solar cells 30 is disposed in a plane parallel to the direction of the output beam 36 and is secured to a mounting plate 31 by a suitable adhesive. This assembly is spaced from an inner wall 32 of the housing 28 by a spacer spring 33 and is aligned axially by a spring plunger 34 and screw 35 and in a direction normal to the axis by a similar spring plunger and screw arrangement, not shown. This array is adapted for providing a first voltage having an amplitude and polarity representative of the displacement and direction of the impinging beam from a reference point on the array along one axis and a second voltage having an amplitude and polarity representative of the magnitude and direction of displacement along a second mutually perpendicular axis. These voltages are amplified and coupled to the meter 22 of FIG. 1 for providing a visual indication of displacement. The beam splitter and planar array are physically oriented in a manner for providing that a reflective component 39 from the target reflective surface 16 of FIG. 1 is reflected from the surface 40 to the planar array.

FIG. 3a illustrates the laser beam components at various points about the reflective means 38 of the apparatus. The output laser beam 36 is identified as $I_0$ having a linear polarization represented by the associated vertical arrow in the figure. The dielectric coated surface provides on the order of 50% of transmission and 50% reflection. The transmitted and reflected components of the output beam are represented by open arrowheads as $I_0/2$. The beam 39 reflected by the target object is represented by the dark arrowheads as $I_0/2$. This reflected beam is further divided into a transmitted component $I_0/4$ which is transmitted to the laser and a component $I_0/4$ which is reflected by the surface 40 to the cell array 31 for sensing alignment. Thus, it can be seen that the maximum efficiency of light transmission between the laser light source, the target reflective surface and the sensing cell array is on the order of 25%.

As indicated hereinbefore, a reflective coating on the dumper mirror 25 and the target reflective surface 16 form a Fabry-Perot interferometer as the reflected beam component $I_0/2$ from the target 16 becomes coincident with the projected beam 12. This interferometer creates undesirable fringes at the planar array 31 which reduces the accuracy of alignment when a very high degree of alignment is desired.

Figure 3B:
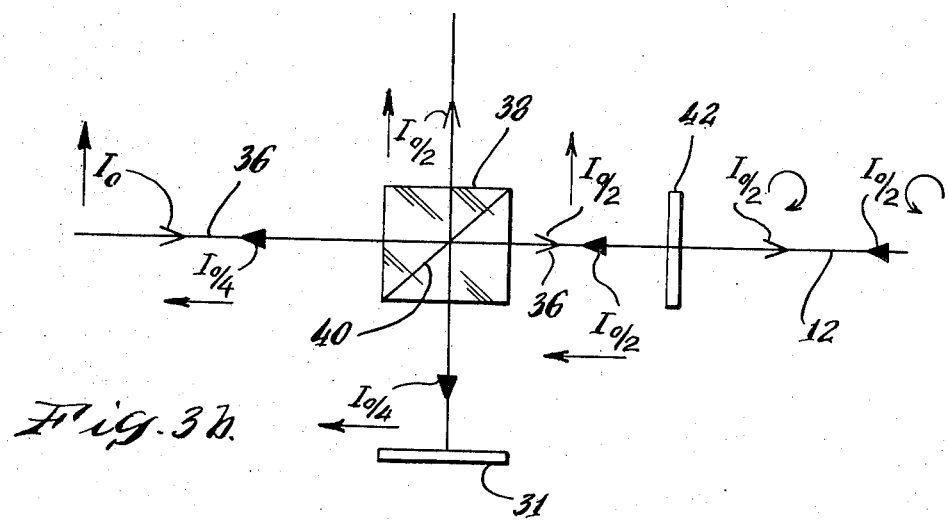

In accordance with a feature of this invention, a polarizing means comprising a quarter wave plate 42 is positioned between the beam reflective means 38 and the target reflective surface 16 for providing relative orthogonal polarization between the output beam 36 and the beam 39 reflected from the target object. This orthogonal relationship substantially inhibits interaction between the beams at the reflective coating of the dumper 25 and at the planar array 30 and the undesired interference fringes are substantially attenuated. In FIG. 2, the quarter wave plate 42 is shown to comprise a disc of conventional material adapted for retarding the incident light beam by 45°. The disc is mounted to the reflective means 38 as shown in FIG. 2 by any suitable adhesive. FIG. 3b illustrates the polarizing effect of the quarter wave plate 42 on the various laser beams as shown in FIG. 3a. The polarization of a projected beam $I_0/2$ is altered from linearly polarized to circularly polarized light. Reflection by the target reflective surface causes a reversal in the phase of the circularly polarized light. This reflected circularly polarized light is reconverted to linearly polarized light as it is transmitted through the plate 42. The beam reflecting means 38 reflects a component $I_0/4$ to the array and transmits a component $I_0/4$ to the laser. The orthogonal relationship between the polarization of $I_0$ and $I_0/4$ substantially attenuates the interference fringes described hereinbefore.

Figure 3C:
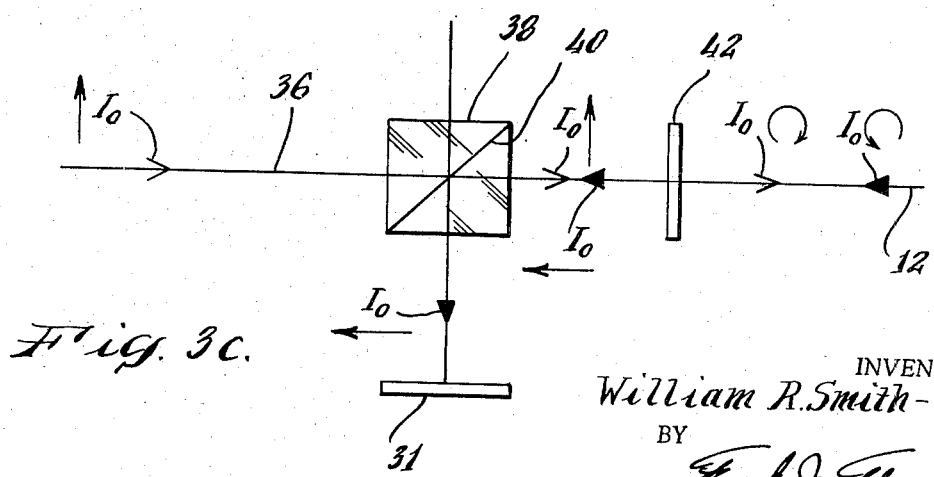

In accordance with another feature of the invention, the efficiency of beam transmission is substantially increased by utilizing a beam reflective means 38 having a surface 40 comprising an optical polarizing material adapted for transmitting a light beam of a first polarization and for reflecting a light beam of orthogonally related polarization. The output light beam from the laser light source is linearly polarized as represented in FIG. 3c. The beam reflective means 38 is adapted for transmitting this particular polarization. Upon reflection from the target surface and transmission through the quarter wave plate 42, the return beam comprises an orthogonally related polarized beam. This latter beam is therefore substantially totally reflected by the surface 40 to the cell array. Thus an efficient beam transmission arrangement is provided in addition to the advantageous effect of attenuating interference fringes.

While I have illustrated and described a particular embodiment of my invention, it will be understood that various modifications may be made therein without departing from the spirit of the invention and the scope of the appended claims.

What is claimed is:

1. In an alignment apparatus which provides a rectilinear light beam for positioning an object in a plane normal to a direction of incidence of the light beam, said apparatus having a laser light source which provides a rectilinear output light beam for projection over a beam path at a reflective surface remotely positioned at a target object, said reflective surface reflecting said beam over said beam path coincidentally with the projected beam upon alignment of said object, a locally positioned beam sensing means, and a locally positioned beam reflective means disposed in the beam path for directing a beam component reflected from the surface at said sensing means, said laser and target reflective surface operating to undesirably create interference fringes at said sensing means when said projected and reflected beams are coincident to a high degree, the improvement comprising a beam polarization means disposed between the light source and the remote reflective surface for altering the relative polarization of the output and reflected beams whereby interference fringes established between the light source and reflective surface are substantially attenuated.

2. The apparatus of claim 1 wherein said polarization means provides relative orthogonal polarization between the output and the reflected beams.

3. The apparatus of claim 2 wherein said beam reflective means comprises a polarizing beam splitter for transmitting light of a first polarization and for reflecting second orthogonally polarized light.

4. The apparatus of claim 2 wherein said polarization means is disposed in said beam path between said beam reflective means and said remotely positioned reflective surface.

5. The apparatus of claim 4 wherein said laser light source provides a linearly polarized output light beam and said polarization means converts the reflected beam to linearly polarized light which is orthogonally related to the output beam.

6. The apparatus of claim 5 wherein said polarization means converts the linearly polarized laser output beam to circularly polarized light and converts a reflected circularly polarized light beam to linearly polarized light which is orthogonally related to said output beam.

7. The apparatus of claim 6 wherein said polarization means comprises a one-quarter wave plate.

8. In an alignment apparatus having a laser light source providing a linearly polarized output beam for projection at a reflective surface remotely positioned at a target object, means including an array of photocells disposed in a plane parallel to the beam for sensing and indicating the location of a centroid of an impinging light beam with respect to a reference point thereon, a beam splitter disposed in the path of the output beam for directing a light beam reflected from said target reflective surface at said beam sensing means, said laser light source and target reflective surface creating an interference fringe pattern at said sensing means, the improvement for attenuating said fringe pattern comprising a polarizing means disposed in the path of said light beam intermediate said beam splitter and said target reflective surface for converting the target reflected beam to linearly polarized light which is orthogonally related to the output beam.

9. The apparatus of claim 8 wherein said polarizing means comprises a one-quarter wave plate.

10. The apparatus of claim 9 wherein said beam splitting means comprises a polarizing beam splitter for transmitting light of a first polarization and for reflecting second orthogonally related polarized light.

11. The apparatus of claim 10 wherein said beam splitting means and beam sensing means are supported in a housing mounted to said laser light source and said quarter wave plate is mounted to said beam splitting means.

12. The apparatus of claim 11 wherein said quarter wave plate is mounted to an output surface of said beam splitting means.

13. An alignment apparatus for positioning a remotely located object in space comprising:
- a laser light source providing an output light beam having a first polarization for projection at a reflective surface of a remotely positioned target object;
- a locally positioned beam sensing means;
- a locally positioned polarizing beam splitter disposed in said beam path for providing substantially complete transmission of said light beam of first polarization toward said target object and substantially complete reflection of a beam of second differing polarization toward said sensing means; and,
- means positioned locally along the beam path between said beam splitter and the target object for altering the polarization of the light beam and providing a beam reflected from said object and impinging on said beam splitter having said second polarization.

References Cited

UNITED STATES PATENTS

| | | | |
|---|---|---|---|
| 2,998,746 | 9/1961 | Gievers | 250—225 |
| 3,031,919 | 5/1962 | Collyer | 356—115 |
| 3,087,377 | 4/1963 | Daley | 356—115 |
| 3,296,921 | 1/1967 | Polster | 356—114 |
| 3,316,799 | 5/1967 | Daley et al. | 250—225 |
| 3,397,608 | 8/1968 | Ellis | 356—116 |
| 3,401,590 | 9/1968 | Massey | 356—114 |
| 3,450,477 | 6/1969 | Meltzer | 356—114 |
| 3,470,377 | 9/1969 | Le Febre et al. | 356—138 |

FOREIGN PATENTS

| | | | |
|---|---|---|---|
| 657,487 | 1963 | Canada | 356—114 |
| 1,192,743 | 1965 | Germany | 356—114 |

RONALD L. WIBERT, Primary Examiner

J. ROTHENBERG, Assistant Examiner

U.S. Cl. X.R.

250—225; 356—152, 153